(12) United States Patent
Paek et al.

(10) Patent No.: US 9,542,438 B2
(45) Date of Patent: Jan. 10, 2017

(54) TERM COMPLETE

(75) Inventors: Timothy S. Paek, Sammamish, WA (US); Bongshin Lee, Issaquah, WA (US); Bo Thiesson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 453 days.

(21) Appl. No.: 12/140,280

(22) Filed: Jun. 17, 2008

(65) Prior Publication Data

US 2009/0313573 A1  Dec. 17, 2009

(51) Int. Cl.
G06F 3/048 (2013.01)
G06F 17/30 (2006.01)
G06F 3/0482 (2013.01)

(52) U.S. Cl.
CPC ....... G06F 17/30401 (2013.01); G06F 3/0482 (2013.01)

(58) Field of Classification Search
CPC .................. G06F 3/0482; G06F 17/30401
USPC .................. 707/100, 102; 715/764, 780
See application file for complete search history.

(56) References Cited

U.S. PATENT DOCUMENTS

| | | | |
|---|---|---|---|
| 4,688,195 A * | 8/1987 | Thompson et al. | 706/11 |
| 5,559,945 A * | 9/1996 | Beaudet et al. | 715/841 |
| 5,708,829 A | 1/1998 | Kadashevich et al. | |
| 6,236,959 B1 * | 5/2001 | Weise | 704/9 |
| 6,411,950 B1 | 6/2002 | Moricz et al. | |
| 6,564,213 B1 * | 5/2003 | Ortega et al. | |
| 6,766,069 B1 | 7/2004 | Dance et al. | |
| 6,859,908 B1 | 2/2005 | Clapper | |
| 7,149,550 B2 | 12/2006 | Kraft et al. | |
| 7,548,899 B1 * | 6/2009 | Del Favero et al. | |
| 7,917,528 B1 | 3/2011 | Dave et al. | |
| 2002/0016804 A1 * | 2/2002 | Wasilewski | G06F 17/30643 715/259 |
| 2002/0087562 A1 * | 7/2002 | McAnaney et al. | 707/100 |
| 2002/0161757 A1 | 10/2002 | Mock et al. | |
| 2004/0254928 A1 * | 12/2004 | Vronay | G06F 17/30401 |

(Continued)

OTHER PUBLICATIONS

"Hash table", taken from http://en.wikipedia.org/wiki/Hash_table, published 2004, 1 page.*

(Continued)

*Primary Examiner* — William Bashore
*Assistant Examiner* — Gregory A Distefano
(74) *Attorney, Agent, or Firm* — Jessica Meyers; Tom Wong; Micky Minhas

(57) ABSTRACT

Real-time query expansion (RTQE) is a process of supplementing an original query with additional terms or expansion choices that are ranked according to some figure of merit and presented while users are still formulating their queries. As disclosed herein, individual terms may be combined and submitted as a phrase into a query. By building the phase term-by-term, users can compositionally formulate queries while maintaining the same benefits that other RTQE interfaces offer. To promote greater flexibility in its working environment, the number of terms that are presented on a display may be reduced. In place of some terms, placeholders may be used and expanded by the user when necessary. This allows phrases to be readily presented on small displays (e.g., hand-held devices).

20 Claims, 10 Drawing Sheets

(56) References Cited

U.S. PATENT DOCUMENTS

| | | | |
|---|---|---|---|
| 2005/0283468 A1* | 12/2005 | Kamvar | G06F 17/30646 |
| 2005/0283473 A1 | 12/2005 | Rousso et al. | |
| 2006/0106769 A1 | 5/2006 | Gibbs | |
| 2006/0129569 A1* | 6/2006 | Dieberger | G06F 3/0482 |
| 2006/0190436 A1 | 8/2006 | Richardson et al. | |
| 2006/0259479 A1 | 11/2006 | Dai | |
| 2006/0265648 A1 | 11/2006 | Rainisto et al. | |
| 2006/0293890 A1 | 12/2006 | Blair et al. | |
| 2007/0050351 A1 | 3/2007 | Kasperski et al. | |
| 2007/0050352 A1 | 3/2007 | Kim | |
| 2007/0061317 A1 | 3/2007 | Ramer et al. | |
| 2007/0157122 A1 | 7/2007 | Williams | |
| 2007/0162422 A1 | 7/2007 | Djabarov | |
| 2007/0168469 A1 | 7/2007 | Church et al. | |
| 2007/0250795 A1* | 10/2007 | Park | 715/864 |
| 2007/0288433 A1 | 12/2007 | Gupta et al. | |
| 2008/0065617 A1 | 3/2008 | Burke et al. | |
| 2008/0086698 A1* | 4/2008 | Hellman et al. | 715/783 |
| 2009/0049010 A1 | 2/2009 | Bodapati | |
| 2009/0055386 A1 | 2/2009 | Boss et al. | |
| 2009/0077037 A1 | 3/2009 | Wu et al. | |
| 2009/0282035 A1 | 11/2009 | Ferreira et al. | |
| 2013/0042175 A1 | 2/2013 | Paek et al. | |

OTHER PUBLICATIONS

Koenemann, et al., "A Case for Interaction: A Study of Interactive Information Retrieval Behavior and Effectiveness", Proceedings of the SIGCHI Conference on Human Factors in Computing Systems: Common Ground, Vancouver, British Columbia, Canada, Apr. 13-18, 1996, pp. 205-212.
Lewis, et al., "Task-Centered User Interface Design", 1994, 190 pages.
Mackenzie, et al., "LetterWise: Prefix-based Disambiguation for Mobile Text Input", Proceedings of the 14th Annual ACM Symposium on User Interface Software and Technology, Orlando, Florida, 2001, pp. 111-120.
"Mobile Phones Could Soon Rival the PC As World's Dominant Internet Platform", IPSOS Insight, Apr. 18, 2006, pp. 1-3.
"Query Expansion" http://faculty.washington.edu/efthimis/pubs/Pubs/qe-arist/QE-arist.html.
"T9 Translator" http://www.t9.com.
White, et al., "Examining the Effectiveness of Real-Time Query Expansion", Information Processing and Management: An International Journal, vol. 43, Issue 3, May 2007, pp. 1-33.
Wigdor, et al., "A Comparison of Consecutive and Concurrent Input Text Entry Techniques for Mobile Phones", Proceedings of the SIGCHI Conference on Human Factors in Computing Systems, vol. 6, No. 1, Vienna, Austria, Apr. 24-29, 2004, pp. 81-88.
Zhang, et al., "Mining Search Engine Query Logs for Query Recommendation", Proceedings of the 15th International Conference on World Wide Web, Edinburgh, Scotland, May 22-26, 2006, pp. 1039-1040.
U.S. Appl. No. 12/140,279, filed Jun. 17, 2008, Paek et al.
U.S. Appl. No. 12/243,638, filed Oct. 1, 2008, Paek et al.
Bast, et al., "Output-Sensitive Autocompletion Search", Retrieved at <<http://www.mpi-inf.mpg.de/~hannah/papers/autocompletion-spire.pdf>>, pp. 12.
Bast, et al., "Type Less, Find More: Fast Autocompletion Search with a Succinct Index", <<http://www.mpi-inf.mpg.de/~hannah/papers/BastWeber-SIGIR2006.pdf>>, SIGIR'06, Aug. 6-11, 2006, Retrieved at. pp. 8.
Bast, et al., "Efficient Interactive Query Expansion with Complete Search", http://delivery.acm.org/10.1145/1330000/1321560/p857-bast.pdf?key1=1321560&key2=3092839121&coll=GUIDE&dl=GUIDE&CFID=173658&CFTOKEN=43151220 >>, CIKM'07, Nov. 6-8, 2007, pp. 857-860.
Beaulieu, M. "Experiments with interfaces to support query expansion", Journal of Documentation, 1997, 53(1), 8-19.
Beaulieu, et al., ENQUIRE Okapi Project. British Library Research and Innovation Report 17, 1997.
Church, et al., "Mobile Content Enrichment", Proceedings of the 12th International Conference on Intelligent User Interfaces, Jan. 28-31, 2007, Honolulu, Hawaii, USA, pp. 112-121.
Church, et al., "Mobile Information Access: A Study of Emerging Search Behavior on the Mobile Internet", ACM Transactions on the Web, vol. 1, No. 1, Article 4, May 2007, pp. 1-38.
Church, et al., "K-Best Suffix Arrays", Proceedings of NAACL HLT 2007, Companion Volume, Rochester, NY, Apr. 2007, pp. 17-20.
Church, et al., "Towards More Intelligent Mobile Search", Proceedings of the 19th International Joint Conference on Artificial Intelligence, Edinburgh, Scotland, 2005, 3 pages.
Church, et al., "The Wild Thing!", Proceedings of the ACL Interactive Poster and Demonstration Sessions, Ann Arbor, Jun. 2005, pp. 93-96.
Croft, et al., "I3R: A new approach to the design of document retrieval systems", Journal of the American Society for Information Science, 38(6), 389-404, 1987.
Cui, et al., "Probabilistic Query Expansion Using Query Logs", Proceedings of the 11th International Conference on World Wide Web, May 7-11, 2002, Honolulu, Hawaii, USA, pp. 325-332.
Dunlop, et al., "Predictive Text Entry Methods for Mobile Phones", Personal Technologies, 4 (2), 2008, pp. 1-10.
Fowkes, et al., "Interactive searching behavior: Okapi experiment for TREC-8. Proc. of the IRSG 2000 Colloquium on IR Research", 2000.
"Google Suggest" http://www.google.com/webhp?complete=1&hl=en.
Jon Louis Bentley, "Multidimensional Binary Search Trees Used for Associative Searching", Communications of the ACM, vol. 18, No. 9, Sep. 1975, pp. 509-517.
Jones, et al., "Sorting out Searching on Small Screen Devices", Proceedings of the 4th International Symposium on Mobile Human-Computer Interaction, 2002, pp. 81-94.
Kamvar, et al., "A Large Scale Study of Wireless Search Behavior: Google Mobile Search", Proceedings of the SIGCHI Conference on Human Factors in Computing Systems, Apr. 22-27, 2006, Montreal, Quebec, Canada, pp. 701-709.
Kamvar, et al., "The Role of Context in Query Input: Using contextual signals to complete queries on mobile devices",Proceedings of the 9th International Conference on Human Computer Interaction with Mobile devices and Services, Singapore, 2007, pp. 405-412.
Restriction/Election cited in related U.S. Appl. No. 12/140,279 dated Apr. 28, 2011.
Reply to Restriction/Election cited in related U.S. Appl. No. 12/140,279 dated May 25, 2011.
Non-Final Office Action cited in related U.S. Appl. No. 12/140,279 dated Jun. 22, 2011.
Reply to Non-Final Office Action cited in related U.S. Appl. No. 12/140,279 dated Sep. 22, 2011.
Final Office Action cited in related U.S. Appl. No. 12/140,279 dated Dec. 9, 2011.
Non-Final Office Action cited in related U.S. Appl. No. 12/243,638 dated Sep. 15, 2011.
Reply to Non-Final Office Action cited in related U.S. Appl. No. 12/243,638 dated Dec. 15, 2011.
"Effective Phrase Prediction", Arnab Nandi and H.V. Jagadish, ACM, VLDB 2007, Vienna, Austria, Copyright 2007, VLDB Endowment, ACM, 12 pages.
Amendment after Allowance cited in U.S. Appl. No. 12/140,279 dated Nov. 30, 2012, 10 pgs.
Amendment after Allowance cited in U.S. Appl. No. 12/243,638 dated Oct. 2, 2012, 10 pgs.
Supplemental Notice of Allowance cited in U.S. Appl. No. 12/243,638 dated Oct. 4, 2012, 2 pgs.
Reply to Final Office Action cited in U.S. Appl. No. 12/140,279 dated Mar. 9, 2012, 15 pgs.
Notice of Allowance cited in U.S. Appl. No. 12/140,279 dated Aug. 30, 2012, 13 pgs.
Notice of Allowance cited in U.S. Appl. No. 12/243,638 dated Mar. 14, 2012, 32 pgs.

(56) References Cited

OTHER PUBLICATIONS

Notice of Allowance cited in U.S. Appl. No. 12/243,638 dated Jul. 2, 2012, 5 pgs.

"Hash Table", From Wikipedia, the free encyclopedia, Dec. 17, 2010, reprinted from the Internet at: http://en.wikipedia.org/wiki/Hash_table, 1 pg.

Kamvar et al., "Query Suggestions for Mobile Search: Understanding Usage Patterns," CHI 2008, Apr. 5-10, 2008, Florence, Italy, 4 pages.

Katz, S., "Estimation of Probabilities from Sparse Data for the Language Model Component of a Speech Recognizer," IEEE Transactions on Acoustics, Speech, and Signal Processing, 35(3), pp. 400-401, 2 pages.

Manber, Udi & Gene Myers, "Suffix Arrays: A New Method for On-Line String Searches," Proceedings of SODA, 1990, 319-327, 9 pages.

Paek et al., "Designing Phrase Builder: A Mobile Real-Time Query Expansion Interface," MobileHCI'09, Sep. 15-18, 2009, Bonn, Germany, 10 pages.

Paek et al., "Search Vox: Leveraging Multimodal Refinement and Partial Knowledge for Mobile Voice Search," Proc. of UIST '08, Oct. 19-22, 2008, pp. 141-150, 9 pages.

Piccolo2D Website, Jun. 5, 2009, retrieved at <http://www.piccolo2d.org> on Dec. 3, 2015, 1 page.

Response filed Oct. 19, 2015 to Non-Final Office Action mailed May 21, 2015 from U.S. Appl. No. 13/652,139, 12 pages.

Notice of Allowance mailed Nov. 18, 2015 from U.S. Appl. No. 13/652,139, 14 pages.

Non-Final Office Action mailed May 21, 2015 from U.S. Appl. No. 13/652,139, 23 pages.

Hock, Ran, "Wild Cards in Google," Feb. 2004, The Extreme Searcher's Web Page, 2 pages.

Notice of Allowability mailed Mar. 17, 2016 from U.S. Appl. No. 13/652,139, 18 pages.

Notice of Allowability mailed May 20, 2016 from U.S. Appl. No. 13/652,139, 9 pages.

Jelinek, Frederick, "Statistical Methods for Speech Recognition," 1997, Cambridge, MA, MIT Press.

Mackenzie, I. Scott and Kumiko Tanaka-Ishii, "Text Entry Systems: Mobility, Accessibility, Universality," 2007, San Francisco, Morgan Kaufmann Publishers.

* cited by examiner

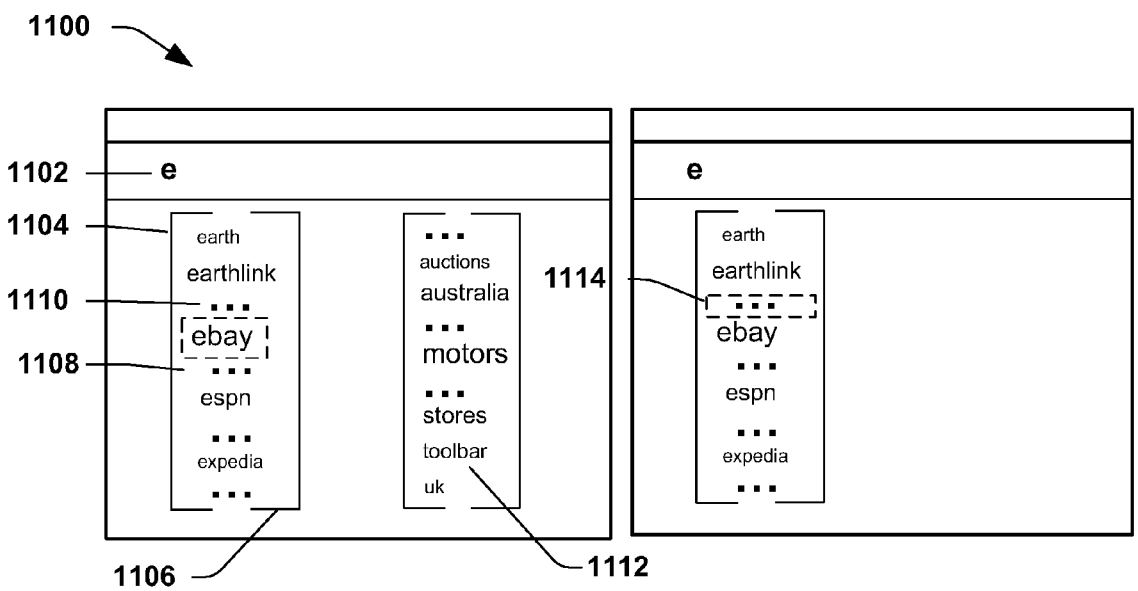
FIG. 11  FIG. 12
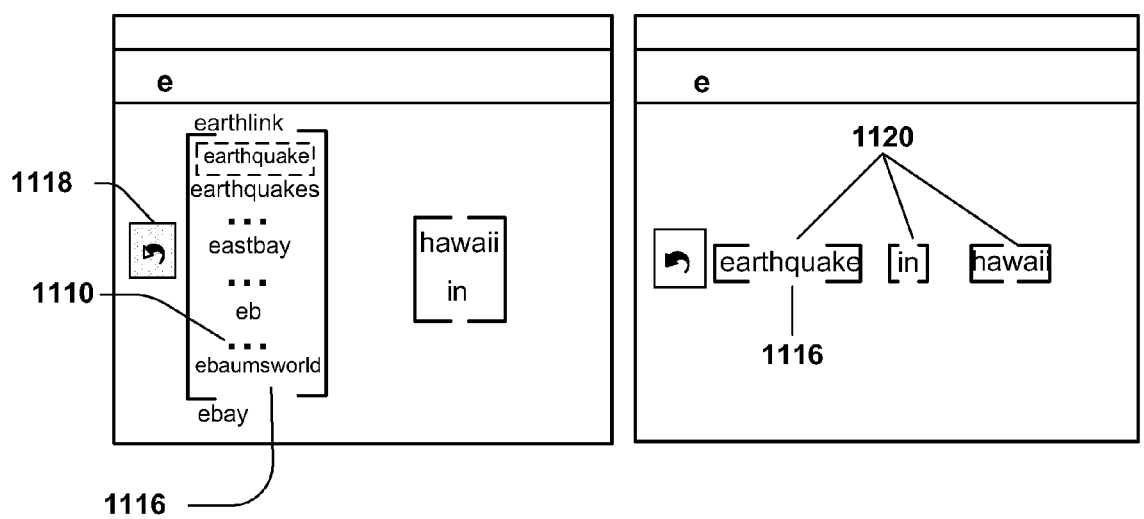
FIG. 13  FIG. 14

TERM COMPLETE

BACKGROUND

Today, many computer-related applications help to facilitate quicker and more accurate text entry. For example, computers often have an auto-complete application that allows the computer to store terms that have been frequently typed, such as a website address, and fill in the missing terms whenever the user begins to reenter the terms at a later date.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques are disclosed that enhance a user's ability to arrive at a desired phrase by auto-completing or suggesting terms that may be desired in a search. In one example, a real-time query expansion (RTQE) interface on a hand-held device can be enhanced while lessening memory space requirements and increasing the usability and effectiveness of text entry for hand-held devices, such as cellular telephones, for example. An RTQE generally comprises one or more databases of terms or expansion choices that are associated in some manner such that when a user enters a first term or part of a first term, a second term or part of the first term is automatically produced.

As provided herein, a user is presented with first and second lists (e.g., where the first list may be a currently focused list and the second list a subsequent list) of predetermined terms, where the second list of terms is a function of a term focused on in the first list, either by default or in response to user input. Lists of terms can be presented in a compact manner by representing one or more terms (e.g., that have a lower figure of merit) as a generic placeholder. Terms represented by a placeholder can be viewed by selecting the corresponding placeholder to zoom in on this collapsed segment of the list.

In one example, a first list of predetermined terms may comprise often chosen terms. Additionally, where fewer than all of the terms in the first list are presented to a user (e.g., due to the compactness of a display), the terms that are presented may be those that have a higher figure of merit (e.g., according to some context of interest). Moreover, the contents of the first list that are displayed to a user may vary depending upon user input. For example, the contents of the first list that are displayed may be adjusted as a user (begins) to spell out a desired term (e.g., in a character entry field).

The content of the second list (e.g., subsequent list) is correspondingly updated when a term in the first list (e.g., currently focused list) is focused on (e.g., either by default and/or by user input). For example, the second list may comprise terms that would commonly follow the term focused on in the first list. Additionally, where fewer than all of the terms in the second list are presented to the user (e.g., due to the compactness of a display), the terms that are presented may be those that have a higher figure of merit (e.g., as relates back to the term focused on in the first list).

Once a user selects a term in the first list, the user may then focus on a term in the second list different from a term focused on by default in the second list, which affects the content of a third list (e.g., another subsequent list) that is displayed. The user can then select a term in the second list and focus on a term in the third list, which affects the content of a fourth list that is displayed, etc. The user may continue to scroll through the lists in this manner until a desired phrase is selected. Once terms constructing a desired phrase are selected, the user may accept the phrase (e.g., by clicking an "accept" button), and the phrase will be presented in a character entry field. The user can also generate a new phrase, for example, by jumping back to a previous list, unselecting a selected term and focusing on a different term.

This process allows the user greater flexibility in choosing phrases by letting the user choose terms commonly associated with prior selected terms, rather than making the user choose an entire phrase, as traditional RTQE interfaces require. It significantly expedites the process of creating a phrase by reducing the number of keystrokes, adding great convenience to a user; particularly on a handheld device since such devices typically have relatively small keys or other input mechanisms. Additionally, if a query is to be run using the accepted phrase, it increases the accuracy of the search by helping users choose relevant terms that may aid in a search engine's retrieval process.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 8 illustrates an exemplary phrase builder interface once a term is selected and a second term is focused on.

FIG. 11 illustrates an exemplary phrase builder interface when one or more terms in a list are unable to be presented in a first manner and a placeholder is used.

FIG. 12 illustrates an exemplary phrase builder interface when a placeholder is being focused on.

FIG. 13 illustrates an exemplary phrase builder interface once a placeholder is selected and terms are presented in a second manner.

FIG. 14 illustrates an exemplary phrase builder interface once terms in a phrase are selected.

DETAILED DESCRIPTION

Figure 1:
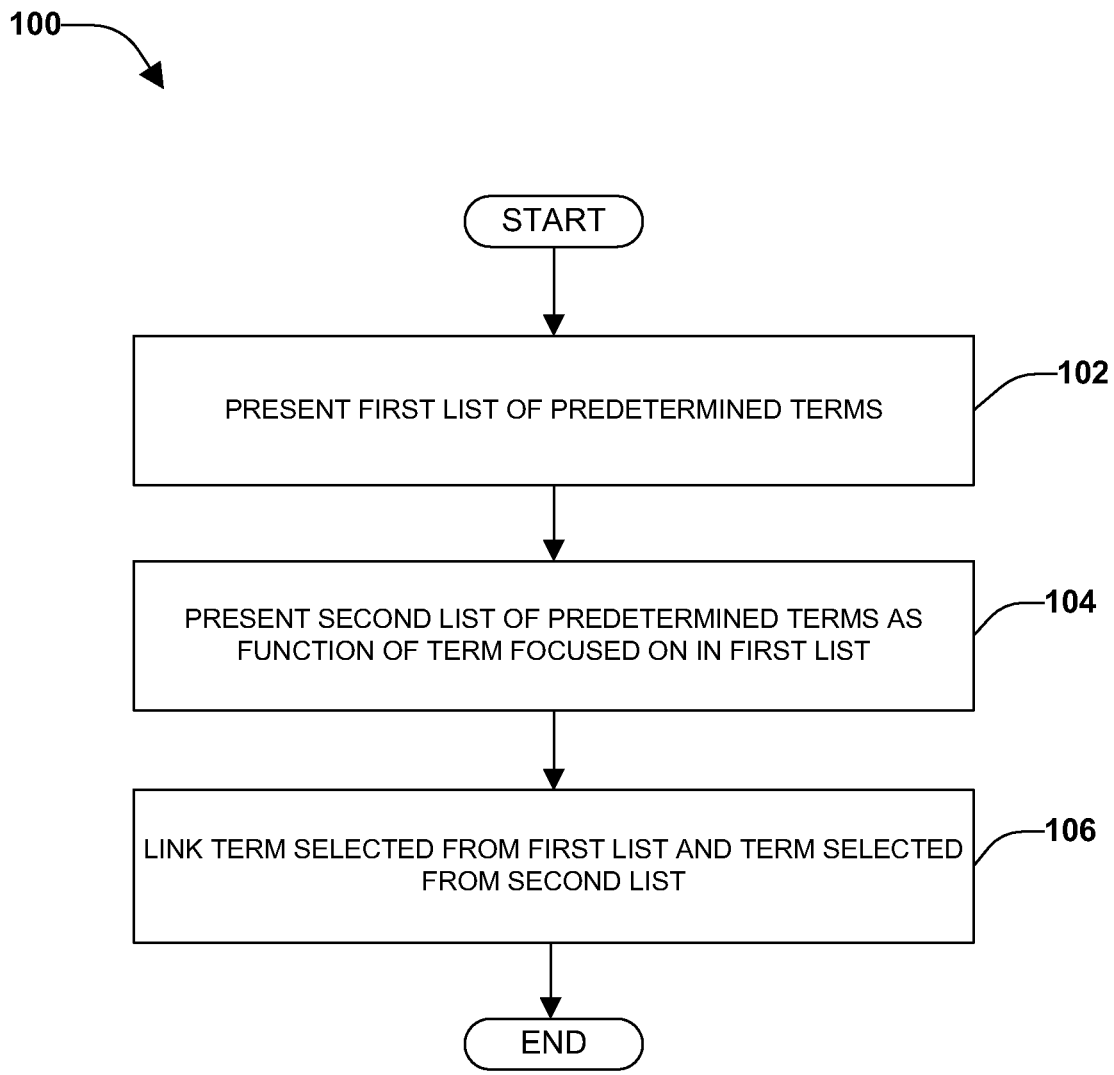
FIG. 1 is a flow chart illustrating an exemplary method of generating phrases using real-time query expansion.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Turning initially to FIG. 1, an exemplary methodology 100 is illustrated for building phrases using real-time query expansion (RTQE) by separately selecting terms linked with one another according to some criteria. In one example, the phrases can be so constructed and used for entering a query into a handheld device, such as a cellular telephone, for example. At 102 a first list (e.g., a currently focused list) of predetermined terms (e.g., terms being stored in a hand-held as a function of the device's storage capacity) is presented in a first manner based on a figure of merit for the different terms in the list. For example, where the size of a display upon which the list is going to be presented to a user is too small to accommodate all of the terms in the list, merely the ten or so terms in the list having higher figures of merit may be presented on the display (e.g., with undisplayed terms represented as a generic placeholder). Additionally, the term in the list having the highest figure of merit, for example, may be presented in some distinguishing manner (e.g., bold, different color, etc.). One example of a figure of merit may comprise a consideration of the popularity of one or more terms (e.g., relative to some context of interest). A term might include, but is not limited to, a word, number, or symbol, for example, but generally does not include a complete phrase. A term in the first list may be focused on by default (e.g., the term having the highest figure of merit, the most popular term in the list, etc.) or by user input, which would override a default focus. To focus on other than a default term, a user may scroll to a different term in the list and/or input (e.g., into a character entry field) part of a desired term until the desired term appears on the list, which can then be focused on by the user. A character may include, but is not limited to a letter, number, or symbol, for example. It will be appreciated that user input can also include a variety of actions, including, for example, navigation into a drop-down menu and/or control to access previous queries and/or popular query logs, for example.

The contents of a second list (e.g., a subsequent list) are adjusted at 104 based upon the term in the first list that is focused on. That is, if a user scrolls up and down the first list, the terms in the second list will be adjusted as different terms in the first list are focused on (e.g., highlighted) during scrolling. As an example, the second list of terms might be generated based on the most common term that would be typed after the term focused on in the first list to complete a phrase (e.g., those terms would have a higher figure of merit based upon the term focused on in the first list). In one example, fewer than all of the terms in the second list may be presented at once (e.g., due to the compactness of a display), and a placeholder may be used to represent one or more undisplayed terms. In this situation, the terms in the second list that are displayed may have a higher figure of merit (e.g., as relates back to the term focused on in the first list). Moreover, a term in the second list having the highest figure of merit may be focused on in the second list by default once a term in the first list has been selected. A user may be able to override this focus by scrolling to and focusing on a different term in the second list and/or entering (into a character entry field) part of a desired term until the desired term appears on the second list, which can then be focused on, selected and ultimately accepted, by the user.

Once a term in the first list and a term in the second list have been selected, the terms are linked to form a phrase at 106. It will be appreciated that even though multiple lists are discussed herein, the phrase may merely include one word (e.g., from one list). The user may accept the phrase, causing it to be presented in a character entry field. An example of where the phrase may be used is on an Internet search engine. The process can be repeated for additional lists, the contents of which are a function of the term focused on in the prior list, and terms can be focused on in these lists to expand the phrase, for example. Alternatively, where additional lists (e.g., additional, subsequent lists) are presented, a user can halt the process by accepting the phrase as constructed (e.g., presenting the phrase in a character entry field where a query is conducted based upon the currently established or constructed phrase). It will also be appreciated that the terms in the different lists (e.g., first, second, third, etc. and/or currently focused, subsequent, etc.) may be altered based upon the available real estate on a display. For example, terms can be respectively added to or removed from a list when a larger or smaller display screen is used. Similarly, more terms of a list may be presented on a device having a larger display screen while fewer terms of the same list may be presented on a different device having a smaller display screen.

Figure 2:
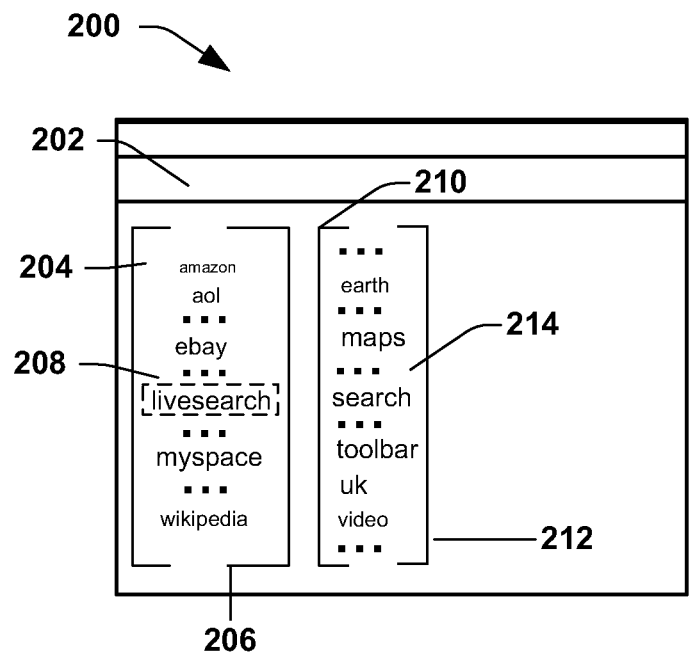
FIG. 2 illustrates an exemplary phrase builder interface.

By way of example, FIGS. 2-9 demonstrate at least some of the advantages of building a phrase term by term (e.g., as provided in FIG. 1). More particularly, FIGS. 2-9 illustrate a display 200 comprising a character entry field 202, a left boundary 204 for a first list, a right boundary 206 for a first list, a first list 208 of predetermined terms, a right boundary 212 for a second list, a left boundary 210 for a second list, and a second list 214 of predetermined terms. In the illustrated example, the first and second lists 208, 214 are presented in alphabetical order and through a "fish-eye" technique such that terms having a higher figure of merit (e.g., more popular, more relevant, etc.) are presented in the middle of the lists in a more distinguished manner (e.g., larger font) relative to other terms presented in the lists. It will be appreciated, however, that such a "fish-eye" technique is not necessary and that other presentation schemes are possible. FIG. 2 illustrates the display 200 without user input (e.g., which may alter the items displayed in the first and/or second lists 208, 214). Based on a term focused on in the first list 208 (either by default and/or user action, such as scrolling and/or text entry, etc.), a second list of predetermined terms is presented in a first manner. In the illustrated example, the terms focused on in the first list is presented in a box. It will be appreciated, however, that focused terms can be presented in other distinguishing manners, such as underlined, different colors, encircled, etc.

Figure 3:
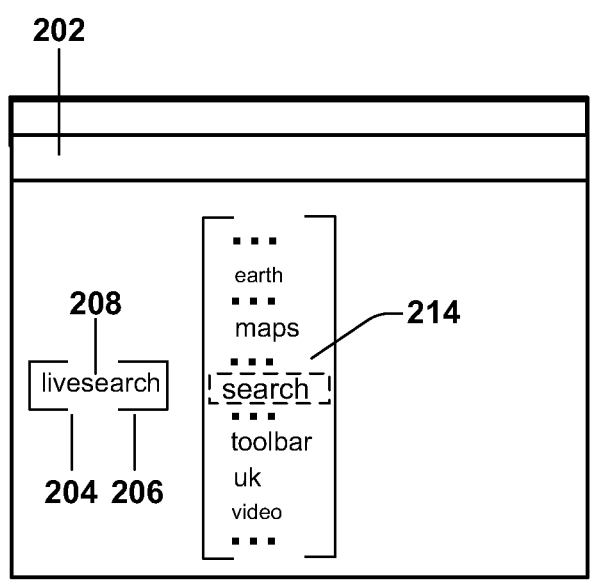
FIG. 3 illustrates an exemplary phrase builder interface after a first term is selected.

FIG. 3 illustrates an example of what may occur when a user selects the focused term in the first list 208 without entering a character into a character entry field 202 (e.g., to alter the terms presented in the first list 208). The first list 208 collapses so that right and left boundaries 204, 206 merely surround the selected term. The character entry field 202 remains blank since the term selected was presented on the first list in the first manner. Once a term has been selected from the first list 208 and a term from the second list 214 is focused on, a third list may be presented and/or a user may select the focused term in the second list 214 and accept the phrase.

Figures 4, 5:
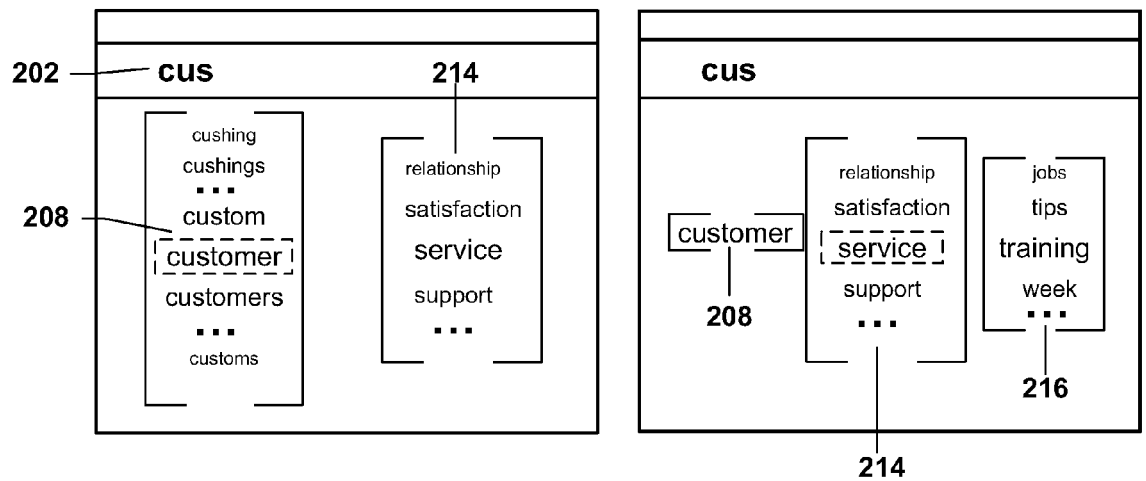
FIG. 4 illustrates an exemplary phrase builder interface after characters are entered into a character entry field and terms presented are correspondingly altered.
FIG. 5 illustrates an exemplary phrase builder interface after a first term is selected, a second term is focused on, and a third list of terms is presented as a function of the term focused on in a second list and the term selected in the first list.

FIG. 4 illustrates an example of what may occur if a desired term is not displayed on a first list of predetermined terms presented in a first manner. A user may enter the beginning characters of a desired term into a character entry field 202. The terms in the first list 208 are altered to those beginning with the same character(s) the user enters. In the example illustrated, the predetermined term having a higher figure of merit and matching those characters already entered is often presented at the center of the displayed list and, by default, is focused on (e.g., "customer"). It will be appreciated, however, that such a "fish-eye" technique is not necessary and that other presentation schemes are possible. Predetermined terms presented in the second list 214 are also altered as a function of characters entered in the character entry field 202 (e.g., since the terms originally presented in the second list 214 may no longer have a higher figure of merit when a different term in the first list 208 is focused on).

As illustrated in FIG. 5, once a first term is selected in the first list 208 of predetermined terms (for example, "customer") and the second list 214 of predetermined terms is presented in a first manner and a term in the second list is focused on (e.g., "service"), a third list 216 of predetermined terms may be presented in a first manner. This third list 216 comprises terms having a higher figure of merit as based upon the selected term in the first list 208 and the focused term in the second list 214 of predetermined terms. Additionally, as in the first 208 and second 214 lists, where fewer than all of the terms in the third list 216 are displayed, those terms that are presented in the first manner may have a higher figure of merit, for example. Additional lists of predetermined terms can be displayed in a similar manner based upon selected and focused terms in previous lists.

Figures 6, 7:
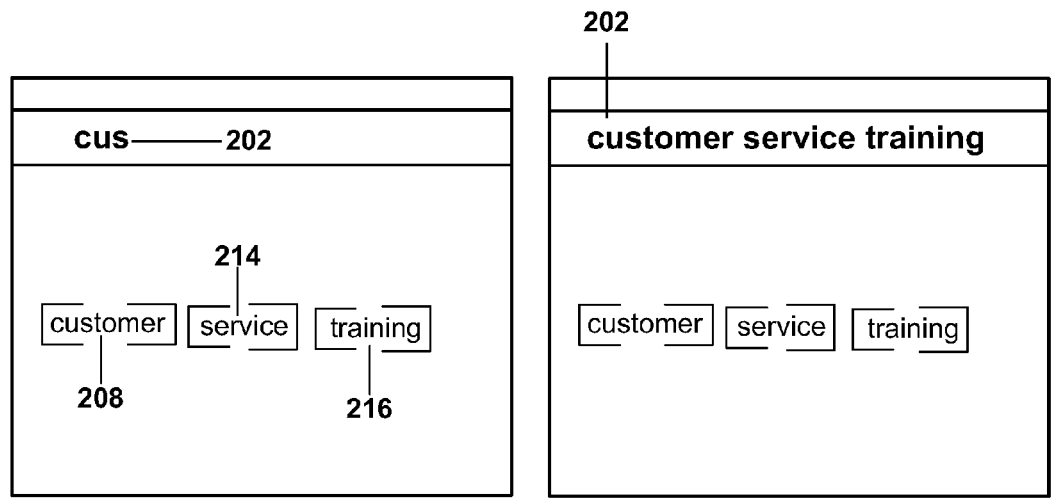
FIG. 6 illustrates an exemplary phrase builder interface after terms are selected.
FIG. 7 illustrates an exemplary phrase builder interface after a phrase is accepted.

FIG. 6 illustrates what may occur once one or more terms have been selected by a user (e.g., an entire phrase has been selected by a user, upon which a query may be based). Respective lists 208, 214, and 216 may then be reduced and/or collapsed to the user-selected terms, for example. In the illustrated example, a fourth list is not presented after a third term is focused on because no other terms commonly follow "customer service training," for example. A collapsed list may be uncollapsed when a selected term in the list is unselected. For example, if the user wished to change the term "training" after it had been selected, the user may unselect the term by returning to the second list and the third list, containing the term "training" would be uncollapsed so that the user may choose a different term.

As FIG. 7 illustrates, a user may accept the phrase as constructed in FIG. 6. The phrase (e.g., "customer service training") is then entered into a character entry field 202 and/or a query may be conducted. In one example, the user may continue to type characters and/or terms after the accepted phrase is entered into the character entry field 202 (e.g., to type a phrase not commonly typed).

Figure 8:
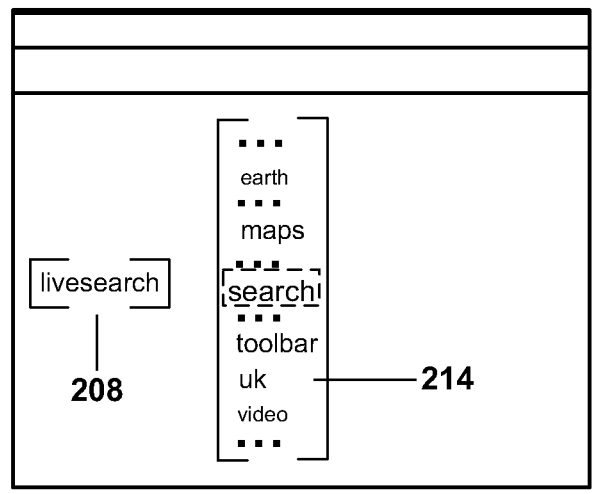
Figure 9:
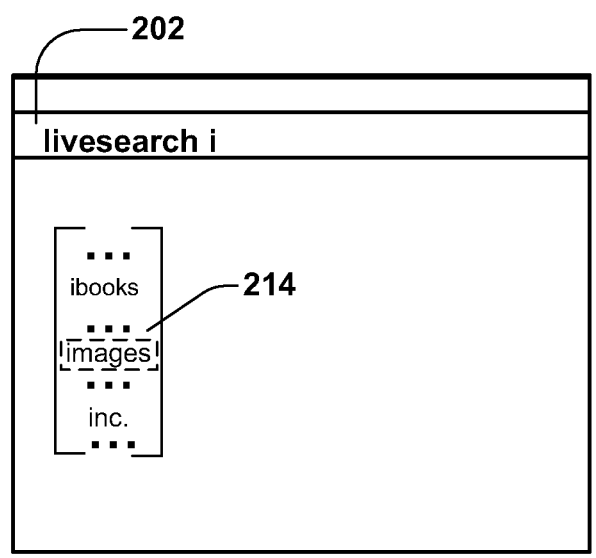
FIG. 9 illustrates an exemplary phrase builder interface once a first term is selected and the terms in the second list are altered because of characters entered into a character entry field.

FIGS. 8-9 illustrate that the contents of a list that are displayed to a user may vary depending upon user input. In one example, a second list can be adjusted based upon the manner that the first list is displayed. In the illustrated example, a user selects a first term (e.g., "livesearch") from the first list 208 and terms commonly related to the term selected from the first list 208 are presented in a first manner in the second list 214. By default, a term in the second list may be focused on and a third list may be presented of terms that commonly follow after the first term selected and the second term focused on. If the desired second term is not displayed in the second list 214 of terms presented, the user may focus on a different term by scrolling through the list or by accepting (e.g., by hitting a complete button) the first term, causing the first term to move into the character entry field 202 and entering a character(s) of a desired second term into the character entry field as depicted in FIG. 9. The second list 214 moves to the position of the first list 208 and is altered according to the characters entered into the character entry field and a term is, by default, focused on. It will be appreciated, in another presentation, that the first list may be collapsed, displaying the selected term from the first list, and the second list may remain in the same position (e.g., it will not move into the first position).

Figure 10:
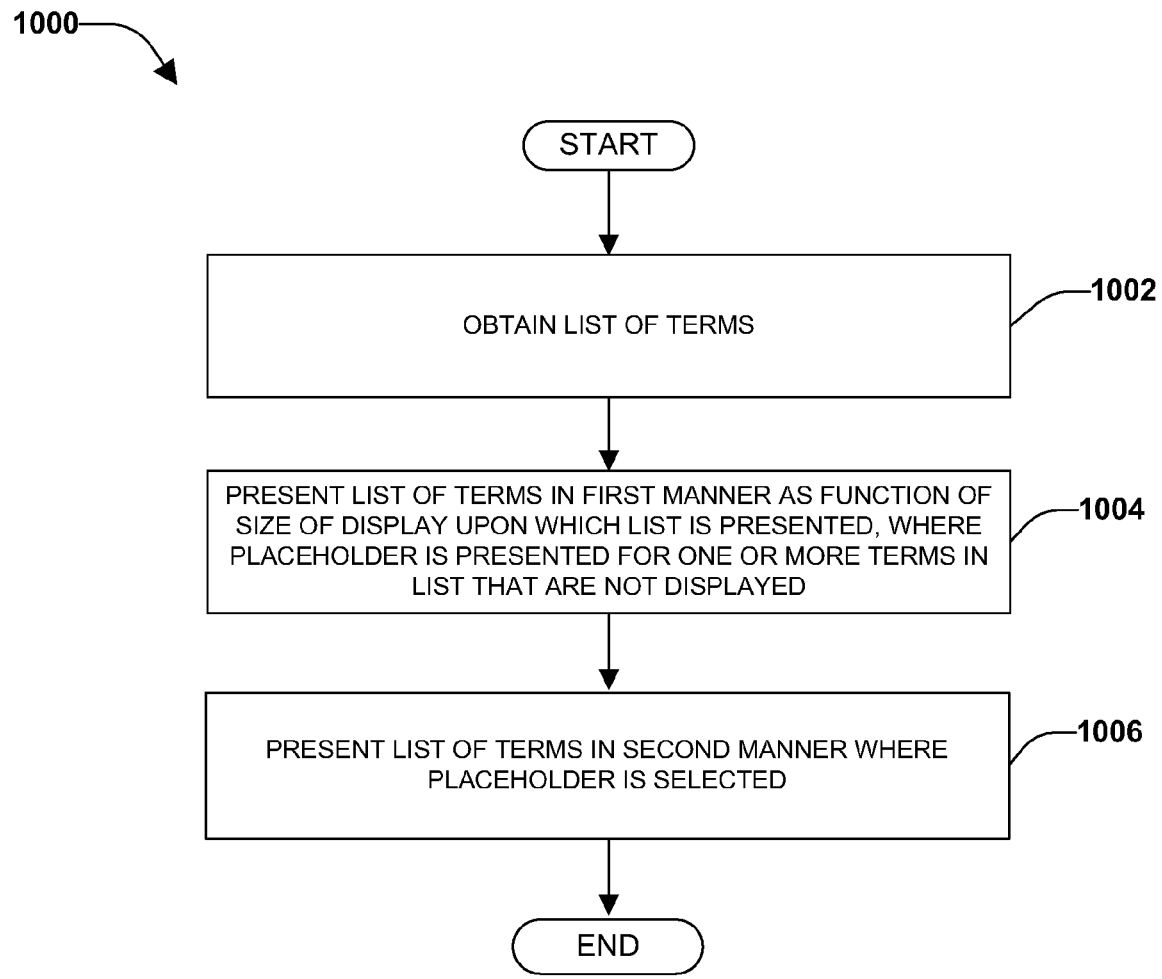
FIG. 10 is a flow-chart illustrating an exemplary method of presenting a list of terms.

FIG. 10 is an exemplary method 1000 for presenting a list of terms. In one example, terms can be displayed on a handheld device, such as a cellular telephone. Terms presented may be combined to build a phrase, for example. The exemplary method begins at 1002 with obtaining a list of terms. One example of how such terms may be obtained is by fetching a compiled list of commonly used terms in a search engine (e.g., relative to some context of interest). In one example, the list of obtained terms 1002 may be stored in a hash table for small prefixes, up to as many characters as memory allows. To handle larger prefixes, secondary and more memory efficient indexes may be implemented, for example.

From the list of obtained terms, the list of terms is presented in a first manner at 1004, the presentation of which is a function of, among other things, the size of a display upon which the terms are presented. The number of terms displayed, for example, may be a function of the height and width of a display on a handheld device and/or desired font size of the terms (e.g., the smaller the screen and the larger the font, the fewer terms displayed). In one example, those terms with a higher figure of merit (e.g., more popular terms, more relevant terms, etc.) may be presented in the first manner. The figure of merit might change, for example, if the user begins to input a part of a desired term into a character entry field. In another example, there may be n "term-only slots" in which to place terms and m "open slots" in which to place either terms or placeholders in a given list as a function of the height and width of the display. A term with a higher figure of merit (e.g., as compared to other terms that are displayed), for example, may be placed in the middle slot and other terms that are displayed may be placed in term-only slots before or after the term in the middle slot as a function of their lexicographical order, for example. Once term-only slots are filled, terms that fall between terms displayed in term-only slots may be displayed or a placeholder may be presented (e.g., where there are too many terms in the list that fall alphabetically between two displayed terms).

In some instances, one or more terms in the list may not be displayed (e.g., when there are limitations on the size of the display). Where terms in the list are unable to be displayed, the list may be presented in a first manner and a generic placeholder may be used as a substitute for the undisplayed terms. For example, an ellipse may be placed between two terms presented in the first manner to indicate that there are other relevant terms that are unable to be presented in the first manner. In one example, the placeholder represents terms that are alphabetically in between the two nearest displayed terms. A placeholder can be presented even if the terms that are displayed change (e.g., different terms are presented with a higher figure of merit relative to those that are not presented because of user input).

Terms may be presented in a second manner where a placeholder is selected at 1006 and a second list may not be presented since the first term focused on is a placeholder. In one example, a user may select the placeholder and one or more terms that were represented by a placeholder may be displayed. If all terms represented by the placeholder are not able to be displayed, one or more placeholders may again be used in this zoomed in view. The user may continue to zoom in and out by selecting different placeholders until a desired term is displayed.

By way of example, FIGS. 11-14 demonstrate at least some of the advantages of presenting a list of terms with placeholders (e.g., as provided in FIG. 9). More particularly, FIGS. 11-14 illustrate a display 1100 comprising a character entry field 1102, a left boundary of a list 1104, a right boundary of a list 1106, a first list (e.g., a currently focused list) of terms presented in a first manner 1108, a placeholder 1110, and a second list (e.g., subsequent list) 1112. In the illustrated example, the placeholder is an ellipse between displayed terms "earthlink" and "ebay." These terms presented in the first manner may have a higher figure of merit (e.g., their relative popularity) relative to other terms on the list, for example, and a placeholder 1110 is used to represent terms with a lower figure of merit between "earthlink" and "ebay."

In FIG. 12, the placeholder is focused on 1114 (e.g. a user focused on the ellipses) and the second list 1112 is not presented. When the user selects and zooms into the placeholder 1110, some terms in the first list, not able to be presented in the first manner 1108, are presented in a second manner 1116 in FIG. 13. In the illustrated example, terms with a higher figure of merit that fall alphabetically between two terms presented in the first manner 1108 are presented in the second manner 1116. It will be appreciated that any ordering is contemplated (e.g., something other than alphabetical). It will also be appreciated that when a selected placeholder 1110 is unselected, the list of terms presented in the first manner 1108 may be presented again. In the example illustrated, a user may select a back arrow 1118 and the terms presented in the first manner 1108 will reappear (e.g., returning to the illustration in FIG. 12). It will also be appreciated that a placeholder may be used in the presentation of terms in the second manner 1116 where one or more terms in the obtained list are unable to be displayed.

FIG. 14 illustrates what occurs when one or more terms have been selected 1120 by a user (e.g., an entire phrase has been selected by a user, upon which a query may be based). In the example illustrated, a user selected a term "earthquake" from the first list of terms presented in the second manner 1116. This term, for example, may be combined with other terms from the list of obtained terms or another list of obtained terms to complete the phrase "earthquake in hawaii." This phrase may be accepted, presented in a character entry field, and be used in an Internet search, for example.

Figure 15:
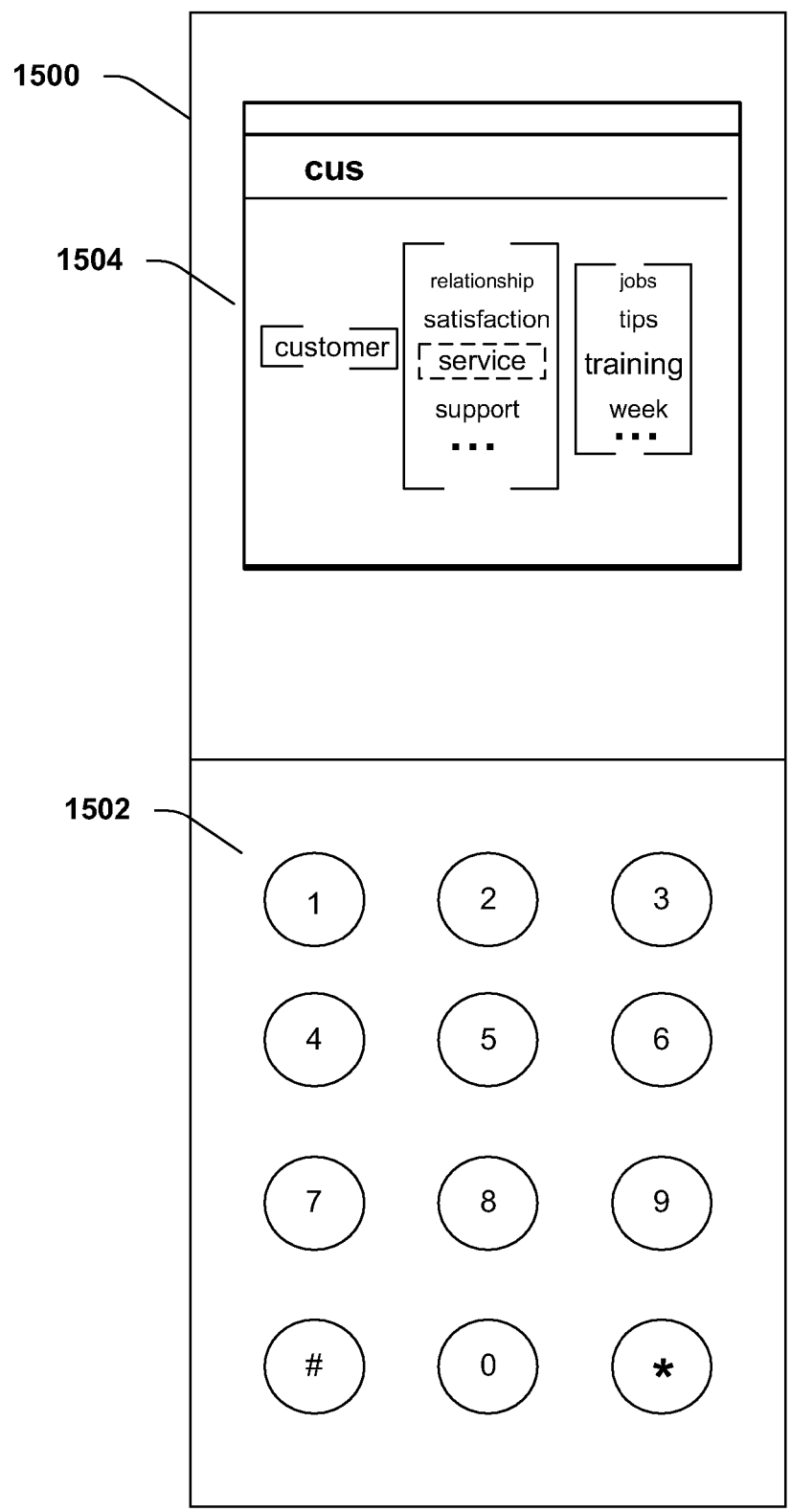
FIG. 15 illustrates an exemplary device where a phrase can be constructed as provided herein.

By way of example, FIG. 15 illustrates one device where a phrase generator can be implemented as provided herein. It comprises a hand-held device 1500 with a numerical keyboard 1502, and a display 1504. The output of a phrase generator may appear on the screen as illustrated, for example. Implementing a phrase generator as provided herein would be useful because of the difficulties (e.g., a limited number of keys, multiple terms assigned to a key, the size of the keys) associated with typing on the (relatively small) numerical keyboard 1502 or other miniature input device (e.g., a keyboard or virtual keyboard).

Figure 16:
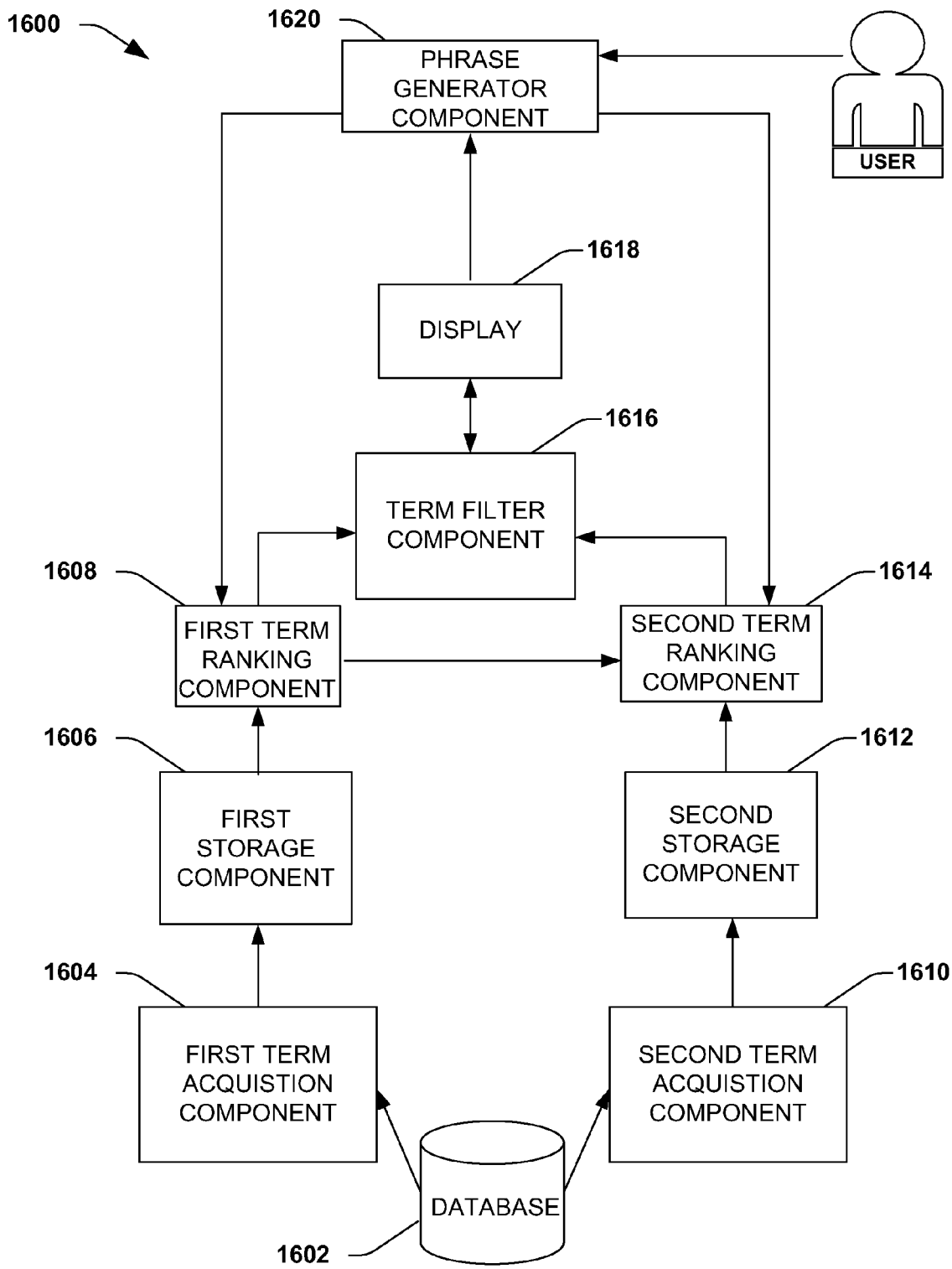
FIG. 16 is a component block diagram illustrating an exemplary system for facilitating phrase building.

FIG. 16 is a schematic block diagram of an exemplary system 1600 configured to assist a user in generating a phrase. The system comprises a storage component 1602 (e.g., database) of terms, a first term acquisition component 1604 configured to obtain a first list (e.g., a currently focused list) of terms, a first storage component 1606 configured to store the first list of terms, a first term ranking component 1608 configured to rank terms in the first list, a second term acquisition component 1610 configured to obtain a second list of terms, a second term storage component 1612 configured to store the second list (e.g., a subsequent list) of terms, a second term ranking component 1614 configured to rank terms in the second list as a function of a ranked term in the first list, a term filter component 1616 configured to determine which ranked terms in the first and seconds lists are to be presented as a function of the size of an associated display, a display 1618 for displaying terms received from the term filter component, and phrase generator 1620 configured to generate a phrase based upon a term selected from the terms presented in the first list and a term selected from the terms presented in the second list.

The first and second term acquisition components 1604, 1610 obtain a first and second list respectively from the storage component 1602 (e.g., database). The storage component 1602 may contain, for example, all terms commonly used to generate a query in a search engine. The acquired terms from the first and second term acquisition components 1604, 1610 are then forwarded to the first and second storage components 1606, 1612, respectively. In one example, these terms are stored on a handheld device where terms with prefixes less than some threshold (e.g., as many characters as memory allows) are stored in a hash table and terms with prefixes greater than some threshold are stored in secondary and more memory efficient indexes.

The first term ranking component 1608 ranks the first terms according to some figure of merit (e.g., popularity of the term, relevance of the term, etc.). A term's figure of merit may also be altered as a function of user input at the phrase generator component 1620. For example, if a user begins to type "cus," the terms that begin with "cus" will have a higher figure of merit than terms that being with "goo." As a function of a term ranked term in the first ranking component 1608, the second term ranking component 1614 ranks the terms stored in the second storage component 1612 according to some figure of merit. For example, if "customer" is focused on (e.g., ranked higher) from the first term ranking component 1608, terms that are commonly associated with "customer" (e.g., service, support, etc.) may be ranked higher than if the first term focused on was "earthquake." A term's figure of merit may also be altered as a function of user input at the phrase generator component. For example, if the user, at the phrase generator component 1620, selects "customer" as the first term, and the terms ranked higher in the second list are undesirable to the user, the user may accept the first term and begin to type a part of a desired second term until a term that is desired is ranked higher by the second term ranking component 1614.

After the first term ranking component 1608 and the second term ranking component 1614 rank the terms in the first and second lists, respectively, the term filer component 1616 determines which terms will be displayed as a function of the size of an associated display 1618. For example, on a handheld device, the display may be capable of only presenting five terms in first and second list prominently. Therefore, for example, the five terms from the first and second lists with a higher rank would be presented more prominently. A placeholder, for example, may be used where one or more terms on the lists are unable to be presented in a first manner. The display 1618 then presents the list, with the terms chosen by the term filter component 1616 presented more prominently.

From the words presented more prominently on the display 1618, the user may select a term from the first and second lists. The phrase generator component 1620 takes the terms selected from the first and second lists and combines them to form a phrase. This phrase may be accepted by the user and used in a query on an Internet search engine, for example.

Figure 17:
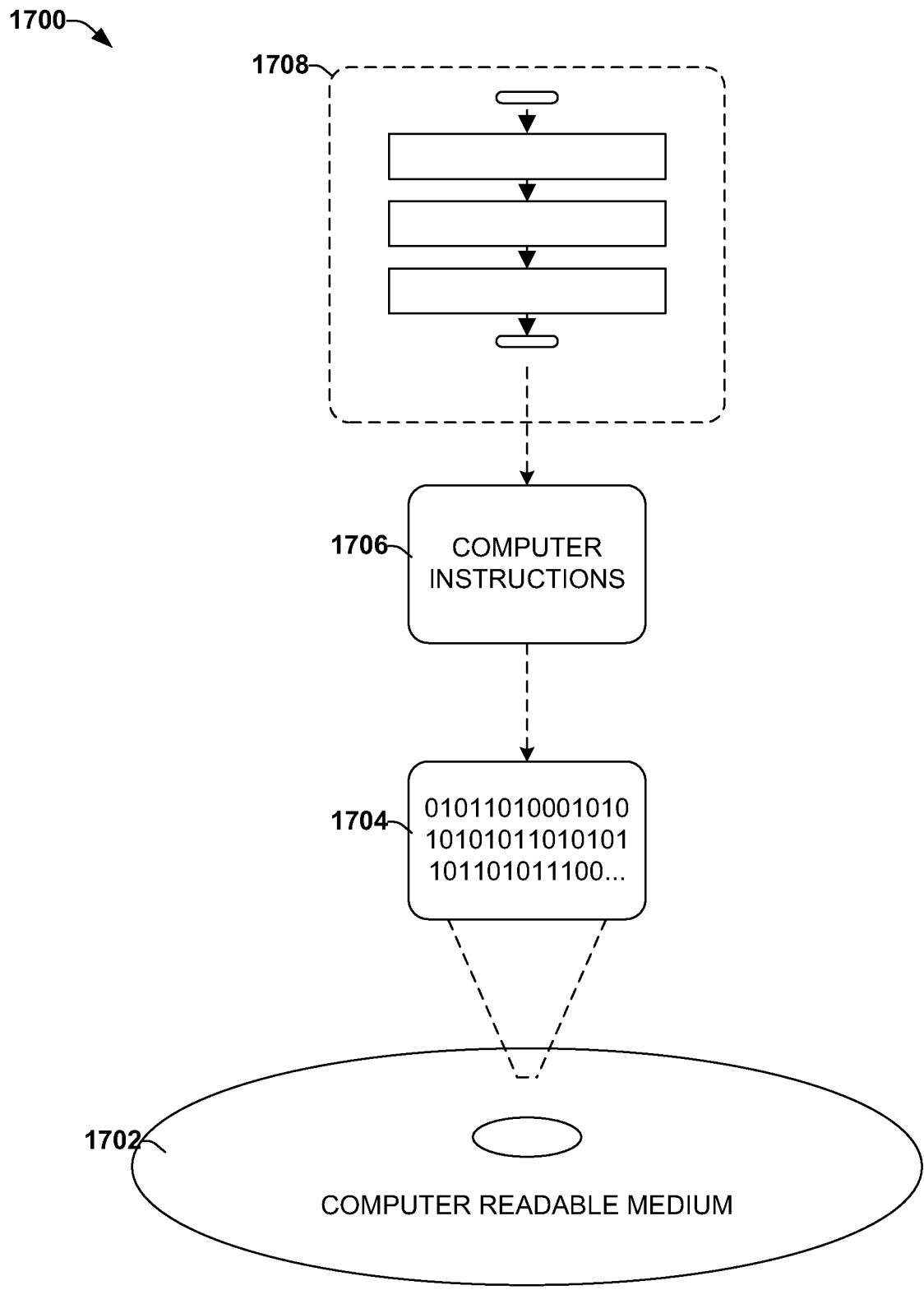
FIG. 17 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 17, wherein the implementation 1700 comprises a computer-readable medium 1702 (e.g., a CD-R, DVD-R, or a platter of a hard disk drive), on which is encoded computer-readable data 1704. This computer-readable data 1704 in turn comprises a set of computer instructions 1706 configured to operate according to one or more of the principles set forth herein. In one such embodiment 1700, the processor-executable instructions 1706 may be configured to perform a method, such as the exemplary methods 100 and 1000 of FIGS. 1 and 10, for example. In another such embodiment, the processor-executable instructions 1706 may be configured to implement a system, such as the exemplary system 1600 of FIG. 16, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 18:
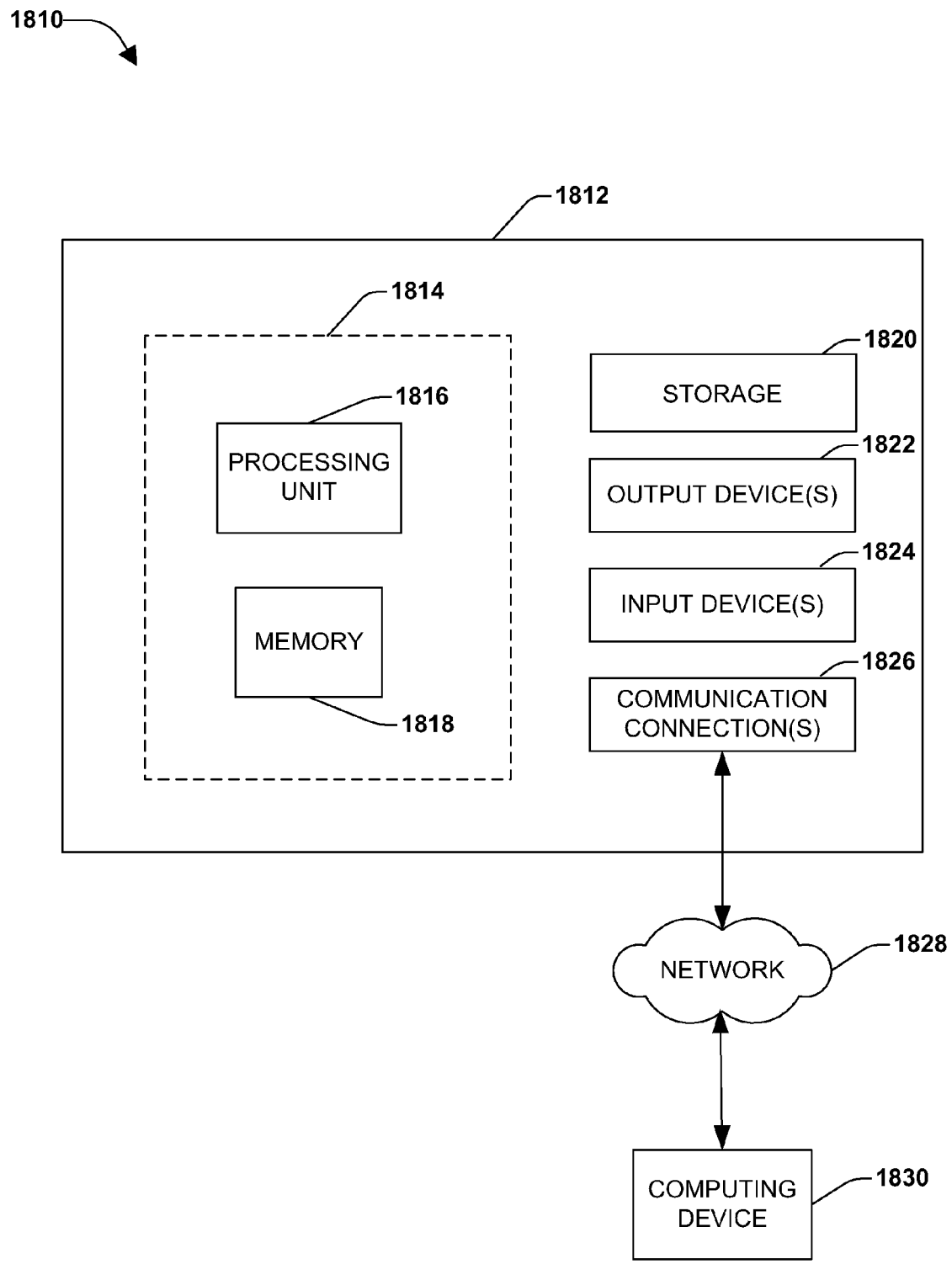
FIG. 18 is an exemplary computing environment wherein one or more provisions set forth herein may be implemented.

FIG. 18 and the following discussion provide a brief, general description of a suitable computing environment to implement embodiments of one or more of the provisions set forth herein. The operating environment of FIG. 18 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 18 illustrates an example of a system 1810 comprising a computing device 1812 configured to implement one or more embodiments provided herein. In one configuration, computing device 1812 includes at least one processing unit 1816 and memory 1818. Depending on the exact configuration and type of computing device, memory 1818 may be volatile (such as RAM, for example), non-volatile (such as ROM, flash memory, etc., for example) or some combination of the two. This configuration is illustrated in FIG. 18 by dashed line 1814.

In other embodiments, device 1812 may include additional features and/or functionality. For example, device 1812 may also include additional storage (e.g., removable and/or non-removable) including, but not limited to, magnetic storage, optical storage, and the like. Such additional storage is illustrated in FIG. 18 by storage 1820. In one embodiment, computer readable instructions to implement one or more embodiments provided herein may be in storage 1820. Storage 1820 may also store other computer readable instructions to implement an operating system, an application program, and the like. Computer readable instructions may be loaded in memory 1818 for execution by processing unit 1816, for example.

The term "computer readable media" as used herein includes computer storage media. Computer storage media includes volatile and nonvolatile, removable and non-removable media implemented in any method or technology for storage of information such as computer readable instructions or other data. Memory 1818 and storage 1820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1812. Any such computer storage media may be part of device 1812.

Device 1812 may also include communication connection(s) 1826 that allows device 1812 to communicate with other devices. Communication connection(s) 1826 may include, but is not limited to, a modem, a Network Interface Card (NIC), an integrated network interface, a radio frequency transmitter/receiver, an infrared port, a USB connection, or other interfaces for connecting computing device 1812 to other computing devices. Communication connection(s) 1826 may include a wired connection or a wireless connection. Communication connection(s) 1826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1812 may include input device(s) 1824 such as keyboard, mouse, pen, voice input device, touch input device, infrared cameras, video input devices, and/or any other input device. Output device(s) 1822 such as one or more displays, speakers, printers, and/or any other output device may also be included in device 1812. Input device(s) 1824 and output device(s) 1822 may be connected to device 1812 via a wired connection, wireless connection, or any combination thereof. In one embodiment, an input device or an output device from another computing device may be used as input device(s) 1824 or output device(s) 1822 for computing device 1812.

Components of computing device 1812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1812 may be interconnected by a network. For example, memory 1818 may be comprised of multiple physical memory units located in different physical locations interconnected by a network.

Those skilled in the art will realize that storage devices utilized to store computer readable instructions may be distributed across a network. For example, a computing device 1830 accessible via network 1828 may store computer readable instructions to implement one or more embodiments provided herein. Computing device 1812 may access computing device 1830 and download a part or all of the computer readable instructions for execution. Alternatively, computing device 1812 may download pieces of the computer readable instructions, as needed, or some instructions may be executed at computing device 1812 and some at computing device 1830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:

receiving user input identifying multiple first characters;

based at least on the multiple first characters identified by the user input, determining a first list of suggested first terms that start with the multiple first characters, other suggested first terms that also start with the multiple first characters, and a second list of suggested second terms;

providing the first list of suggested first terms and the second list of suggested second terms for display on a display of a computing device, the first list being provided for display with a placeholder representing the other suggested first terms that also start with the multiple first characters identified by the user input, the placeholder being provided for display within the first list of suggested first terms;

in at least one instance, receiving a user selection of the placeholder from the first list of suggested first terms that start with the multiple first characters;

responsive to receiving the user selection of the placeholder, causing the second list to be removed from the display and providing the other suggested first terms that also start with the multiple first characters for display;

receiving a user acceptance of an individual other suggested first term; and responsive to receiving the user acceptance, adding the individual other suggested first term to a phrase.

2. The method of claim 1, further comprising:
displaying the first list of suggested first terms on the display of the computing device.

3. The method of claim 2, further comprising:
responsive to receiving the user selection of the placeholder, removing the second list from the display of the computing device.

4. The method of claim 3, further comprising:
identifying an individual suggested first term from the first list that has focus; and
determining the suggested second terms of the second list based at least on the individual suggested first term that has focus.

5. The method of claim 4, further comprising:
determining that the individual suggested first term has focus based at least on another user input.

6. The method of claim 3, wherein the user input is a typing input.

7. The method of claim 3, further comprising:
in at least one other instance, receiving another user acceptance of an individual suggested second term from the second list; and
adding the individual suggested second term to the phrase.

8. The method of claim 3, the computing device comprising a handheld device.

9. A computing device comprising:
a processor; and
a memory storing processor-executable instructions which, when executed by the processor, cause the processor to:
receive, from a user, user input identifying multiple first characters;
based at least on the multiple first characters identified by the user input, determine a first list of suggested first terms that start with the multiple first characters, other suggested first terms that also start with the multiple first characters, and a second list of suggested second terms;
cause a presentation of the first list of suggested first terms and the second list of suggested second terms to be shown to the user, the first list being presented with a placeholder representing the other suggested first terms that also start with the multiple first characters identified by the user input, the placeholder being presented within the first list of suggested first terms;
in at least one instance, receive a user selection of the placeholder from the first list of suggested first terms that start with the multiple first characters;
responsive to receiving the user selection of the placeholder, cause the second list to be removed from the presentation and cause the other suggested first terms that also start with the multiple first characters to be provided on the presentation;

receive a user acceptance of an individual other suggested first term; and
responsive to receiving the user acceptance, add the individual other suggested first term to a phrase.

10. The computing device of claim 9, embodied as a handheld computing device.

11. The computing device of claim 9, wherein the processor executable instructions, when executed by the processor, cause the processor to:
identify a particular suggested first term that has focus; and
identify the second list of suggested second terms based at least on the particular suggested first term that has focus.

12. The computing device of claim 11, wherein the processor executable instructions, when executed by the processor, cause the processor to:
determine respective figures of merit for the suggested first terms, the other suggested first terms, and the suggested second terms; and
cause the suggested first terms, the other suggested first terms, and the suggested second terms to be presented to the user in specific orders based at least on the respective orders of merit.

13. The computing device of claim 12, the respective figures of merit reflecting popularity of the suggested first terms, the other suggested first terms, and the suggested second terms.

14. A handheld computing device, comprising:
a display;
a processor; and
a memory storing processor-executable instructions which, when executed by the processor, cause the processor to:
receive user input identifying multiple first characters;
based at least on the multiple first characters identified by the user input, determine a first list of suggested first terms that start with the multiple first characters, other suggested first terms that also start with the multiple first characters, and a second list of suggested second terms;
display the first list of suggested first terms and the second list of suggested second terms on the display, the first list being displayed with a placeholder representing the other suggested first terms that also start with the multiple first characters identified by the user input, the placeholder being displayed within the first list of suggested first terms;
in at least one instance, receive a user selection of the placeholder from the first list of suggested first terms that start with the multiple first characters;
responsive to receiving the user selection of the placeholder, remove the second list from the display and display the other suggested first terms that also start with the multiple first characters;
receive a user acceptance of an individual other suggested first term; and
responsive to receiving the user acceptance, add the individual other suggested first term to a phrase.

15. The handheld computing device of claim 14, wherein the processor-executable instructions, when executed by the processor, cause the processor to:
obtain, from a search engine, a compiled list of commonly-used terms; and
identify the first suggested first terms from the compiled list.

16. The handheld computing device of claim 15, wherein the processor-executable instructions, when executed by the processor, cause the processor to:
   obtain the other suggested first terms from the compiled list.

17. The handheld computing device of claim 16, wherein the processor-executable instructions, when executed by the processor, cause the processor to:
   obtain the suggested second terms from the compiled list.

18. The handheld computing device of claim 17, the compiled list comprising a hash table.

19. The handheld computing device of claim 18, wherein the processor-executable instructions, when executed by the processor, cause the processor to:
   submit the phrase to the search engine as a query.

20. The handheld computing device of claim 14, wherein the processor-executable instructions, when executed by the processor, cause the processor to:
   identify a particular suggested first term that has focus prior to the user selection of the placeholder;
   identify the second list of suggested second terms based at least on the particular suggested first term that has focus; and
   in at least one other instance:
   receive another user acceptance of an individual suggested second term from the second list; and
   add the individual suggested second term to the phrase.

* * * * *